(12) United States Patent
Papandreou

(10) Patent No.: US 6,318,756 B1
(45) Date of Patent: Nov. 20, 2001

(54) APPARATUS FOR ATTACHING A STEERING WHEEL TO A STEERING SHAFT

(75) Inventor: John P. Papandreou, Shelby Township, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/662,063

(22) Filed: Sep. 14, 2000

(51) Int. Cl.$^7$ ...................................................... B62D 1/16
(52) U.S. Cl. ............................ 280/775; 280/731; 74/552
(58) Field of Search ................................... 280/775, 779, 280/731, 771, 728.2; 74/492, 493, 552

(56) References Cited

U.S. PATENT DOCUMENTS

| | | | |
|---|---|---|---|
| 3,424,473 | * | 1/1969 | Morgan .................................. 280/775 |
| 3,619,992 | * | 11/1971 | Brelsford et al. ...................... 56/10.1 |
| 4,481,838 | * | 11/1984 | Findley et al. ......................... 74/493 |
| 4,607,539 | | 8/1986 | Arima et al. . |
| 4,903,988 | | 2/1990 | Jambor et al. . |
| 5,085,466 | | 2/1992 | Nakatsuka et al. . |
| 5,277,442 | | 1/1994 | Cuevas . |
| 5,333,897 | | 8/1994 | Landis et al. . |
| 5,342,089 | * | 8/1994 | Fink et al. ............................. 280/731 |
| 5,409,256 | | 4/1995 | Gordon et al. . |
| 5,439,252 | * | 8/1995 | Oxley et al. .......................... 280/775 |
| 5,553,888 | * | 9/1996 | Turner et al. ......................... 280/731 |
| 5,741,025 | * | 4/1998 | Meyer et al. ......................... 280/731 |
| 5,749,598 | * | 5/1998 | Exner et al. ....................... 280/728.2 |
| 5,797,622 | | 8/1998 | Turner et al. . |
| 5,797,696 | | 8/1998 | Baynes et al. . |
| 5,890,397 | * | 4/1999 | Stoner et al. ........................... 74/493 |
| 5,950,499 | * | 9/1999 | Hosoi et al. ............................ 74/552 |
| 5,954,359 | * | 9/1999 | Ross ..................................... 280/731 |
| 6,109,646 | * | 8/2000 | Nagata et al. ........................ 280/731 |

* cited by examiner

Primary Examiner—Brian L. Johnson
Assistant Examiner—Deanna Draper
(74) Attorney, Agent, or Firm—Tarolli, Sundheim, Covell, Tummino & Szabo L.L.P.

(57) ABSTRACT

An apparatus (10) comprises a vehicle steering wheel (12) having a hub portion (54) that includes an axially extending inner sleeve (80) having a circumferentially spaced plurality of openings (86). A vehicle steering shaft (14) has an end portion (120) that includes a circumferentially extending arcuate groove (124). A plurality of bearing elements (110) are at least partially disposed in the openings (86) in the inner sleeve (80). The bearing elements (110) are movable in a radial direction within the openings (86) between a disconnected condition and a connected condition. The disconnected condition permits relative axial movement between the steering wheel (12) and the steering shaft (14). The connected condition blocks relative axial movement between the steering wheel (12) and the steering shaft (14). An axially movable collar (130) is engageable with the bearing elements (110) to move the bearing elements in the radial direction from the disconnected condition to the connected condition. The bearing elements (110) are moved by the collar (130) to the connected condition in which the bearing elements are partially located within the openings (86) and partially located in the arcuate groove (124) in the steering shaft (14).

14 Claims, 6 Drawing Sheets

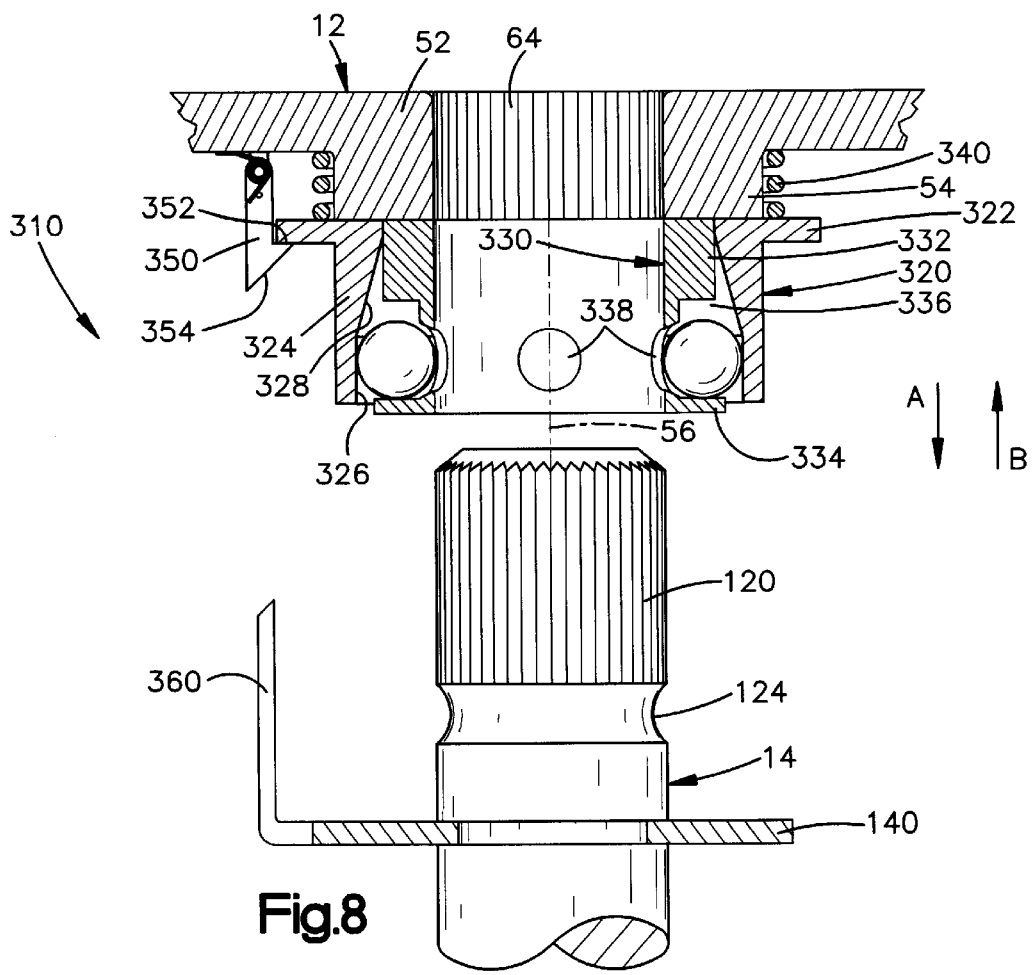
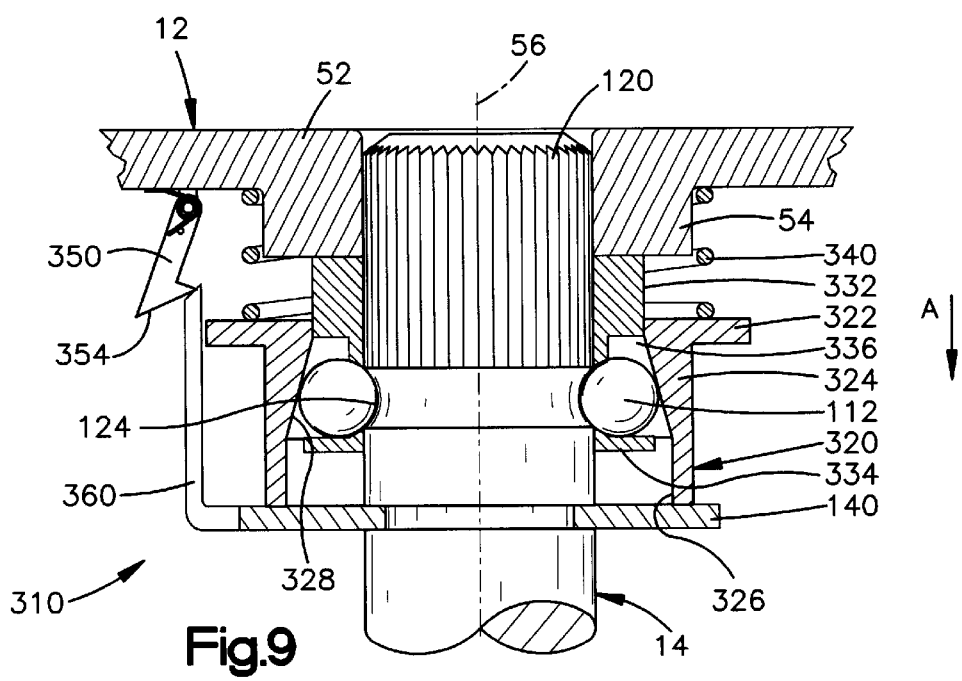

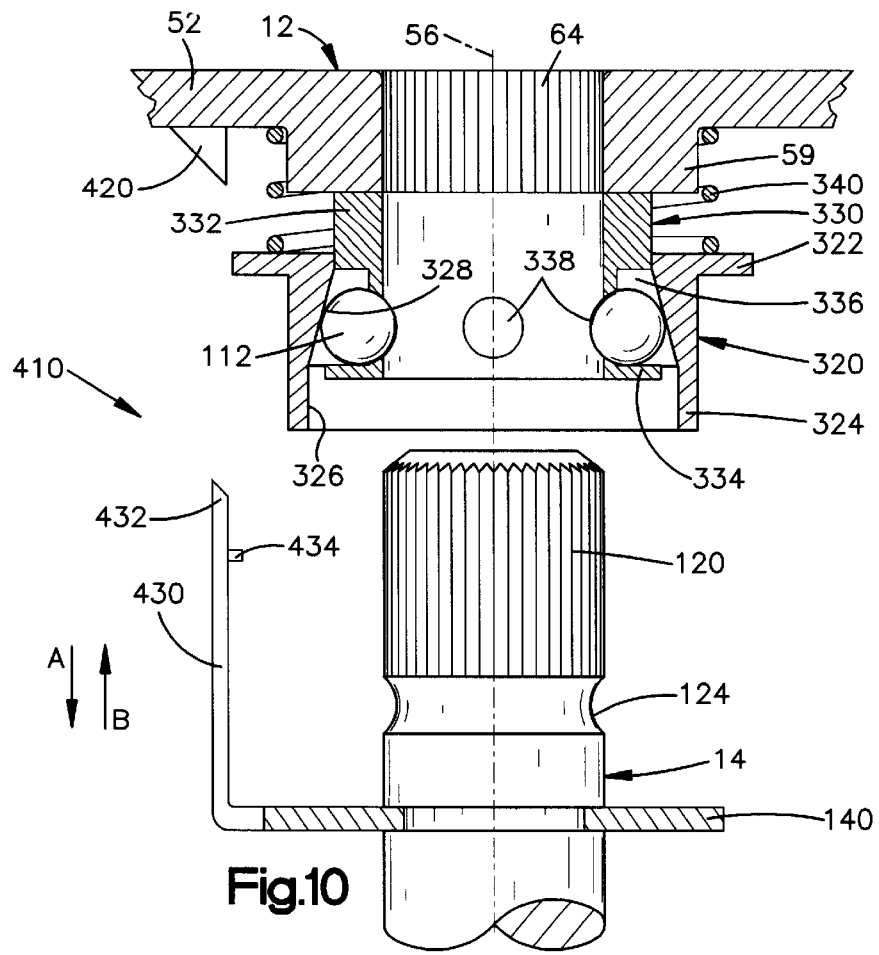
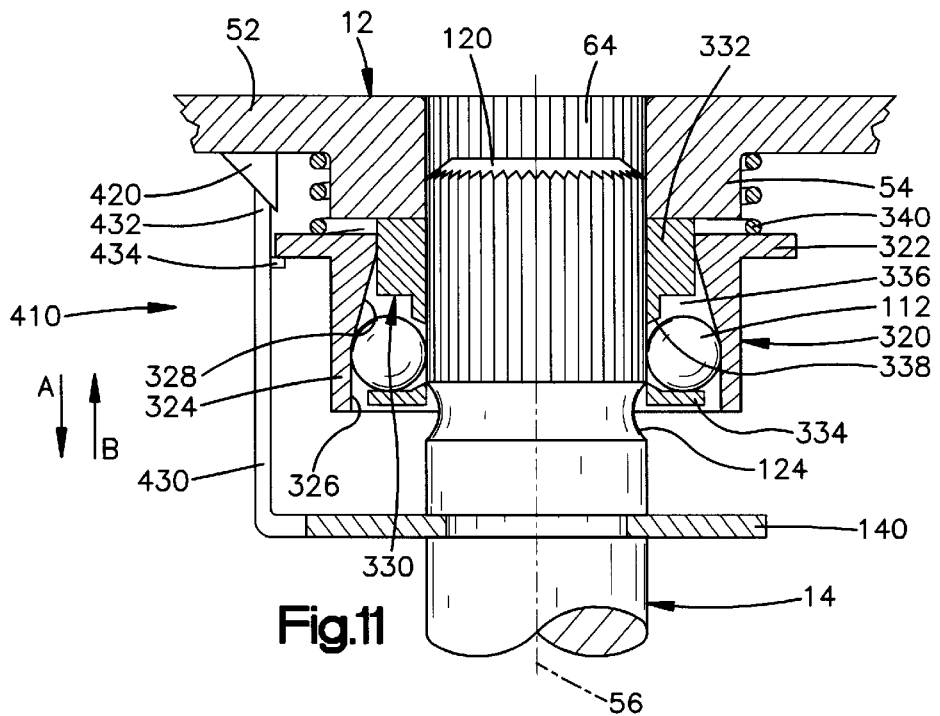

APPARATUS FOR ATTACHING A STEERING WHEEL TO A STEERING SHAFT

TECHNICAL FIELD

The present invention relates to an apparatus for attaching a vehicle steering wheel to a vehicle steering shaft.

BACKGROUND OF THE INVENTION

The steering shaft in a vehicle is typically connected for joint rotation with a rotatable vehicle steering wheel using complementary splines on the shaft and the hub of the steering wheel. To prevent relative axial movement between the steering wheel and the steering shaft along the splines, it is common to use an axially extending fastener to secure the steering wheel to the steering shaft.

It is also known to use a radially extending fastener, similar to a setscrew, to prevent relative axial movement between the steering wheel and the steering shaft. Radially extending fasteners are commonly used with so-called "integrated" steering wheel assemblies in which an air bag module is incorporated into a steering wheel prior to installation of the steering wheel on the steering shaft. Use of radially extending fasteners can be difficult, however, because there is usually limited space to access such fasteners in the area where the steering wheel connects with the steering shaft.

It is desirable to have a "snap-on" apparatus for attaching a vehicle steering wheel to a steering shaft that eliminates the use of a fastener and allows for "blind" attachment of the steering wheel to the steering shaft.

SUMMARY OF THE INVENTION

The present invention is an apparatus comprising a vehicle steering wheel having a hub portion. The hub portion includes an axially extending inner sleeve having a circumferentially spaced plurality of openings. A vehicle steering shaft has an end portion that includes a circumferentially extending arcuate groove. A plurality of bearing elements are at least partially disposed in the plurality of openings in the inner sleeve of the steering wheel. The plurality of bearing elements are movable in a radial direction within the plurality of openings between a disconnected condition and a connected condition. The disconnected condition permits relative axial movement between the steering wheel and the steering shaft. The connected condition blocks relative axial movement between the steering wheel and the steering shaft. An axially movable collar is engageable with the plurality of bearing elements to move the bearing elements in the radial direction from the disconnected condition to the connected condition. The plurality of bearing elements are moved by the collar to the connected condition in which the bearing elements are partially located within the plurality of openings and partially located in the arcuate groove in the steering shaft.

BRIEF DESCRIPTION OF THE DRAWINGS

The foregoing and other features of the present invention will become apparent to those skilled in the art to which the present invention relates upon reading the following description with reference to the accompanying drawings, in which:

FIG. 8 is an exploded sectional view of an apparatus for attaching a vehicle steering wheel and a steering shaft in accordance with a third embodiment of the present invention;

FIG. 9 is a sectional view of the apparatus of FIG. 8 illustrating a fully assembled condition;

FIG. 10 is an exploded sectional of an apparatus for attaching a vehicle steering wheel and a steering shaft in accordance with a fourth embodiment of the present invention;

FIG. 11 is a sectional view of the apparatus of FIG. 10 illustrating a partially assembled condition;

DESCRIPTION OF PREFERRED EMBODIMENTS

Figure 1:
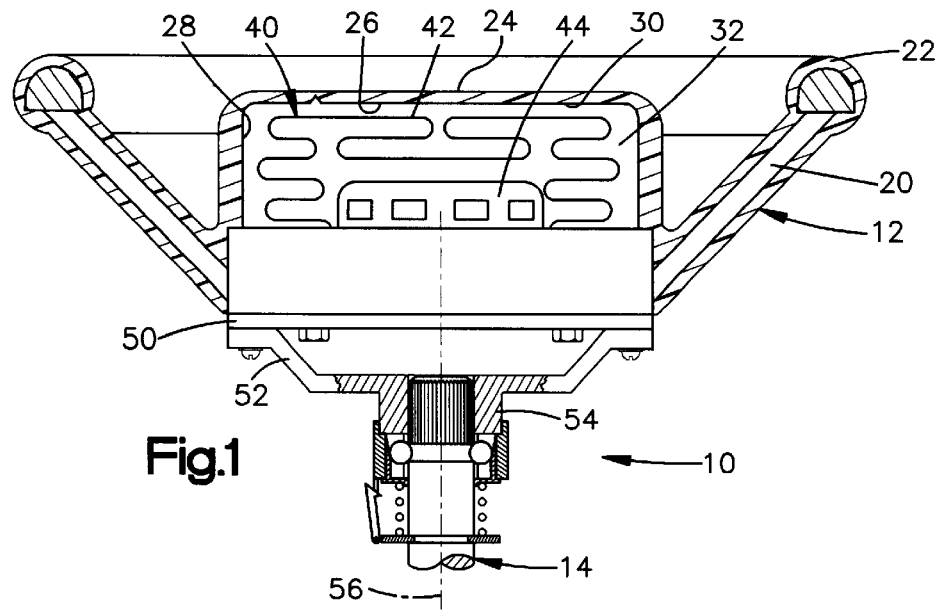
FIG. 1 is a schematic view, partly in section, of a vehicle steering wheel, a steering shaft, and an apparatus for attaching the vehicle steering wheel to the steering shaft in accordance with a first embodiment of the present invention.

FIG. 1 illustrates a first embodiment of an apparatus 10 for attaching a vehicle steering wheel 12 to a vehicle steering shaft 14 in accordance with the present invention. The steering wheel 12 includes an armature 20. A non-removable cover 22 is attached to the armature 20. The cover 22 has a continuous outer surface 24 that extends uninterruptedly over a central area of the steering wheel 12. In accordance with the illustrated embodiment, the cover 22 is made of a homogeneous urethane material molded about the armature 20. An inner surface 26 of the cover 22 has a side wall portion 28 and an end wall portion 30. The side wall portion 28 and the end wall portion 30 define a cavity 32 in the cover 22. As is known in the art, a horn switch device (not shown) may be located in the cavity 32.

The steering wheel 12 includes an air bag module 40 comprising an inflatable air bag 42 and an actuatable inflator 44 for, when actuated, inflating the air bag. The air bag 42 is located in the cavity 32 in the cover 22, along with a portion of the inflator 44 that extends into the cavity. The inflator 44 is attached to the armature 20 in a known manner. A retaining ring (not shown) secures the air bag 42 about the inflator 44.

The armature 20 includes a frame member 50 and a lower bracket 52 that is attached to the frame member. A metal hub portion 54 extends axially from the lower bracket 52 of the armature 20. The hub portion 54 is centered on an axis 56. The hub portion 54 is preferably cast into the lower bracket 52 of the armature 20 and is thus fixed to the armature.

The hub portion 54 includes a cylindrical outer surface 58 (FIG. 2) and a radially extending end surface 60. An axially extending inner surface 62 defines a passage 64 through the hub portion 54. The passage 64 is centered on the axis 56. The inner surface 62 includes splines (not numbered).

An axially extending inner sleeve 80 projects from the end surface 60 of the hub portion 54. The inner sleeve 80 is attached to the hub portion 54 by welding or other suitable means. It is contemplated that the inner sleeve 80 could be formed in one piece with the hub portion 54, such as by casting the inner sleeve as part of the hub portion. The inner sleeve 80 has cylindrical inner and outer surfaces 82 and 84. A circumferentially spaced plurality of openings 86 extend radially between the inner and outer surfaces 82 and 84.

An axially extending outer sleeve 90 encircles the inner sleeve 80. The outer sleeve 90 projects from the end of the hub portion 54 and is attached to the hub portion by welding or other suitable means. It is contemplated that the outer sleeve 90 could be formed in one piece with the hub portion 54, such as by casting the outer sleeve as part of the hub portion. The outer sleeve 90 has cylindrical inner and outer surfaces 92 and 94. The outer sleeve 90 includes an axially extending tab 96 having a radially outwardly facing ramp surface 98.

The inner surface 92 of the outer sleeve 90 and the outer surface 84 of the inner sleeve 80 define a chamber 100 between the sleeves. A plurality of bearing elements 110 are disposed in the chamber 100. In the embodiment of FIGS. 1–4, the bearing elements 110 comprise balls 112 and thus have a spherical shape. Each of the balls 112 is at least partially disposed in a respective one of the openings 86 in the inner sleeve 80 at all times. The balls 112 are movable radially within the openings 86, which have diameters smaller than the diameter of the balls. The radial width of the chamber 110 is less than the diameter of the balls 112. As a result, the outer sleeve 90 is engageable by the balls 112 to prevent the balls from coming completely out of the openings 86.

The steering shaft 14 is rotatable about the axis 56. The steering shaft 14 includes an end portion 120 having a cylindrical outer surface 122. The outer surface 122 includes splines (not numbered) for meshing with the splines on the inner surface 62 of the hub portion 54 to connect the steering wheel non-rotatably with the steering shaft 14. A circumferentially extending arcuate groove 124 is located immediately below (as viewed in FIGS. 1–4) the splines on the steering shaft 14.

An axially movable collar 130 is disposed about the end portion 120 of the steering shaft 14. The collar 130 encircles the steering shaft 14 and has a cup shape defined by a radially extending base portion 132 and an axially extending flange portion 134. The flange portion 134 includes an radially inwardly facing tapered surface 136.

A radially extending mounting member 140 is secured to the steering shaft 14 below (as viewed in FIGS. 1–4) the collar 130. The mounting member 140 is pressed into a circumferential slot 142 in the steering shaft 14.

Figure 2:
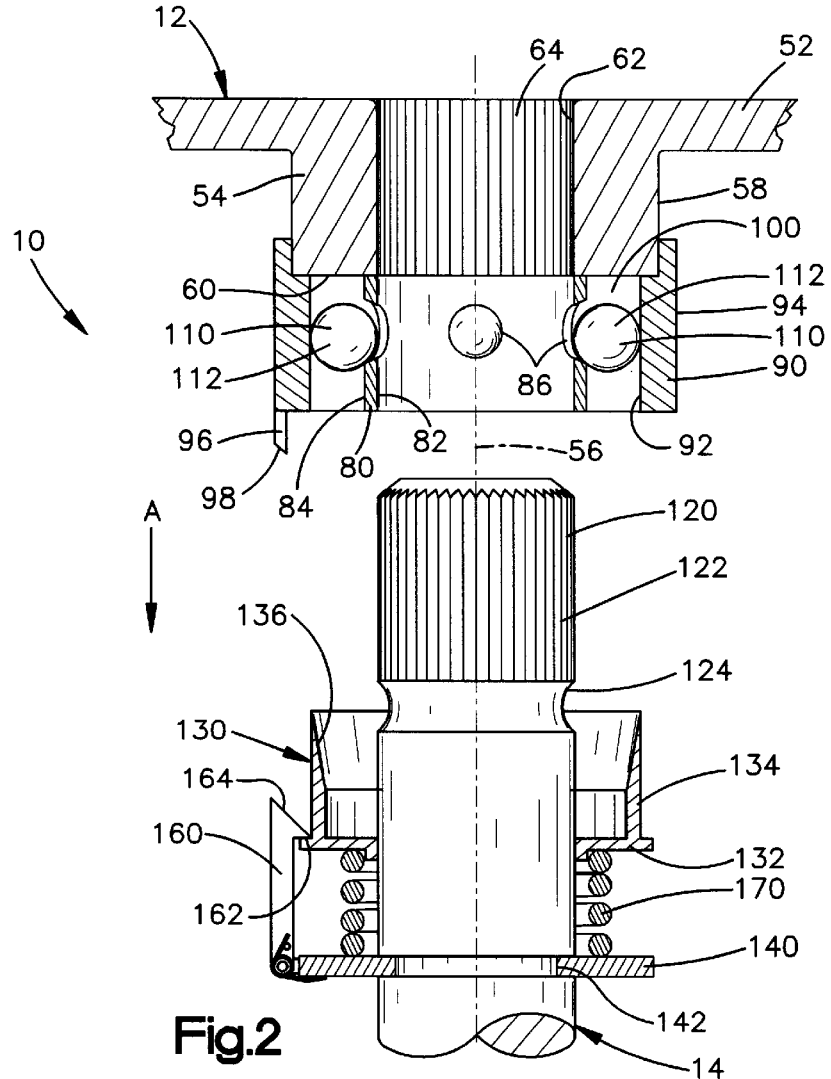
FIG. 2 is an exploded sectional view of a portion of the apparatus of FIG. 1 illustrating a pre-assembly condition.
Figure 4:
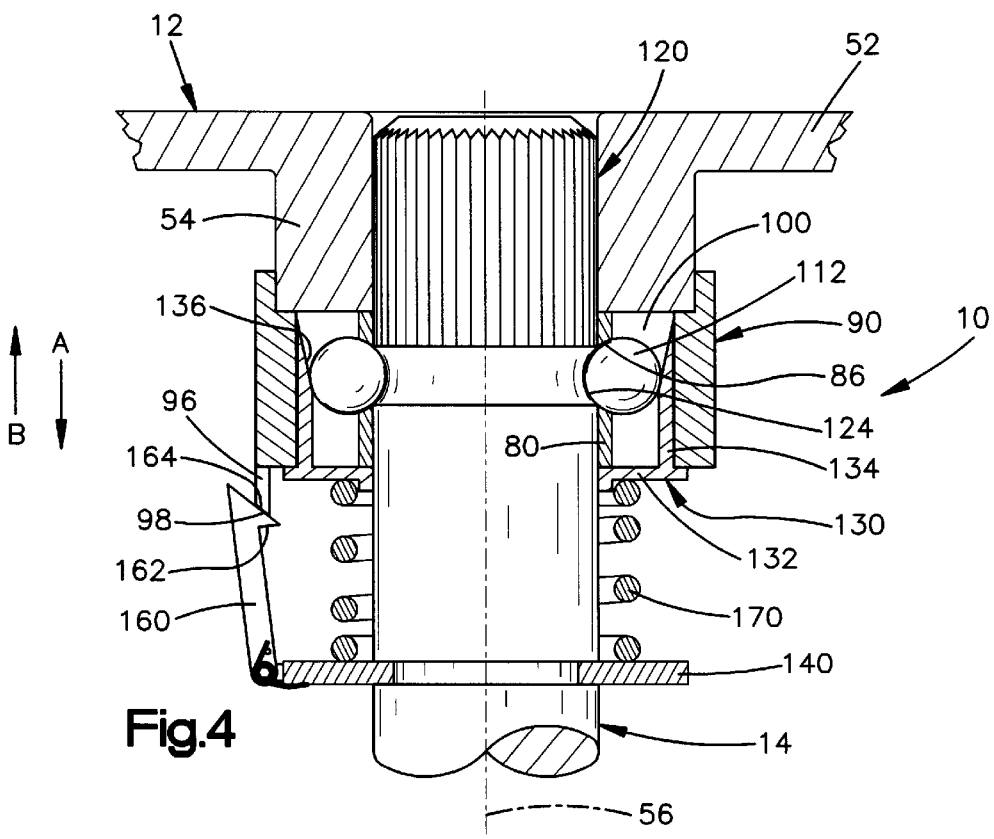
FIG. 4 is a sectional view of the portion of the apparatus shown in FIG. 2 illustrating a fully assembled condition.

A latch member 160 is pivotally mounted to a radially outer edge of the mounting member 140. The latch member 160 includes a catch surface 162 that is engageable with the base portion 132 of the collar 130. The latch member 160 further includes an angled end surface 164. The latch member 160 is spring-biased radially inward toward engagement with the collar 130, as shown in FIG. 2, but can be deflected radially outward against its spring bias away from engagement with the collar, as shown in FIG. 4. It should be understood that, although only one latch member 160 is shown, more than one latch member may be employed.

A spring 170 is positioned between the base portion 132 of the collar 130 and the mounting member 140. The spring 170 encircles the steering shaft 14 and biases the collar 130 away from the mounting member 140.

Figure 3:
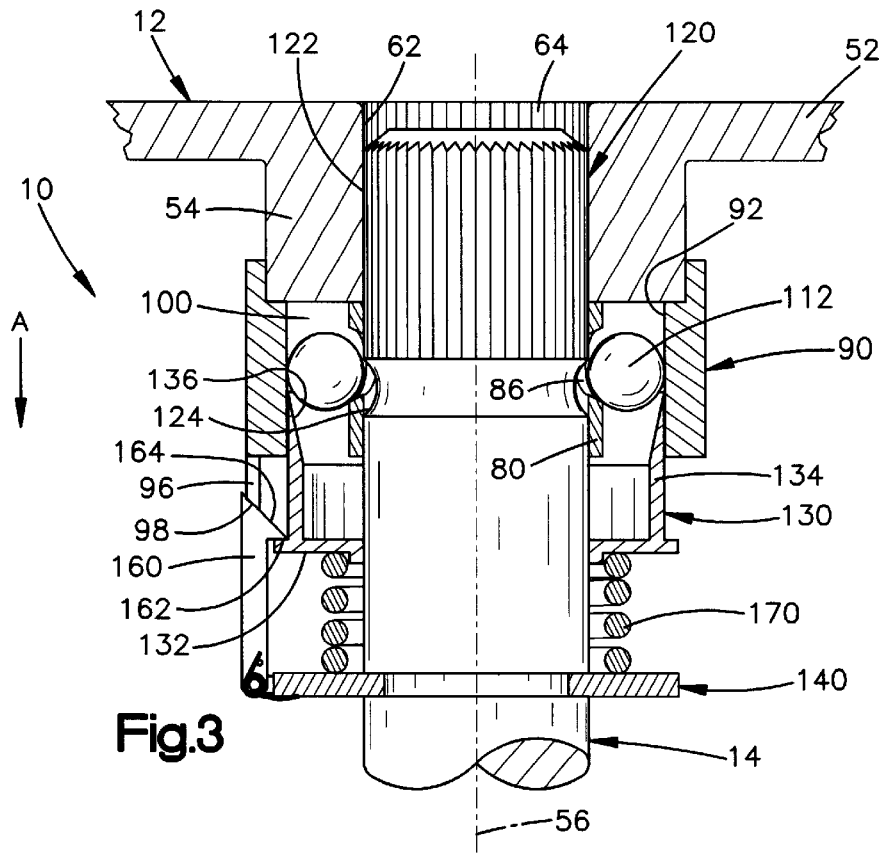
FIG. 3 is a sectional view of the portion of the apparatus shown in FIG. 2 illustrating a partially assembled condition.

FIGS. 2 and 3 illustrate the steering wheel 12 and the steering shaft 14 in a disconnected condition. To connect the steering wheel 12 to the steering shaft 14, the collar 130 is first placed into a cocked (i.e., drawn back and ready to be released) position illustrated in FIG. 2. The cocking of the collar 130 is done by pushing the collar in a downward direction, indicated by arrow A, against the bias of the spring 170 until the catch surface 162 on the latch member 160 engages the base portion 132 of the collar 130 to hold the collar in the cocked position.

Next, the hub portion 54 of the steering wheel 12 is placed over the end portion 120 of the steering shaft 14 such that the end portion is received in the passage 64 through the hub portion (see FIG. 3). The splines on the inner surface 62 of the hub portion 54 mesh with the splines on the outer surface 122 of the steering shaft 14 to connect the steering shaft for joint rotation with the steering wheel 12. As the steering wheel 12 is pushed in the downward direction A, the flange portion 134 of the collar 130 on the steering shaft 14 slides into the chamber 100 between the inner and outer sleeves 80 and 90. When the ramp surface 98 on the tab 96 on the outer sleeve 90 first engages the angled end surface 164 on the latch member 160 see FIG. 3, the tapered surface 136 on the flange portion 134 of the collar 130 is about to engage the balls 112 in the chamber 100.

To complete the attachment of the steering wheel 12 to the steering shaft 14, the steering wheel is pushed farther in the downward direction A from the position of FIG. 3 to the connected condition illustrated in FIG. 4. As the steering wheel 12 is moved into the connected condition, the tab 96 on the outer sleeve 90 deflects the latch member 160 radially outward, causing the latch member to disengage from the base portion 132 of the collar 130. The collar 130 is then forced in an upward direction, indicated by arrow B in FIG. 4, by the bias of the spring 170. The collar 130 moves in the upward direction B until the base portion 132 of the collar 130 engages the outer sleeve 90, as shown in FIG. 4.

As the collar 130 moves upward, the tapered surface 136 on the flange portion 134 of the collar engages the balls 112 and slides into a position radially outward of, or behind, the balls, forcing the balls to move radially inward. The balls 112 are moved radially inward by the flange portion 134 of the collar 130, and are thus pushed farther into the openings 86 in the inner sleeve 80. A portion of each of the balls 112 projects through a respective one of the openings 86 and is forced into the arcuate groove 124 in the steering shaft 14 that has become radially aligned with the openings 86 as a result of the downward movement of the steering wheel 12.

As shown in FIG. 4, the tapered surface 136 on the collar 130 is disposed behind the balls 112 and thus holds the balls in the arcuate groove 124. The positioning of the collar 130 behind the balls 112 prevents the balls from moving radially outward and thereby maintains the apparatus 10 in the connected condition of FIG. 4. In the connected condition, relative axial movement between the steering wheel 12 and the steering shaft 14 is blocked by the engagement of the balls 112 in the groove 124.

To remove the steering wheel 12 from the steering shaft 14, the collar 130 must be retracted from the position shown in FIG. 4 to the position of FIG. 3. The collar 130 is retracted using a tool (not shown). After the collar 130 is retracted, the balls 112 are no longer held in the groove 124 and are free to move radially outward out of the groove. The steering wheel 12 is then pulled in the upward direction B, causing the balls 112 to cam out of the arcuate groove 124. With the balls 112 disengaged from the groove 124, the steering wheel 12 can be removed from the end portion 120 of the steering shaft 14.

Figure 7:
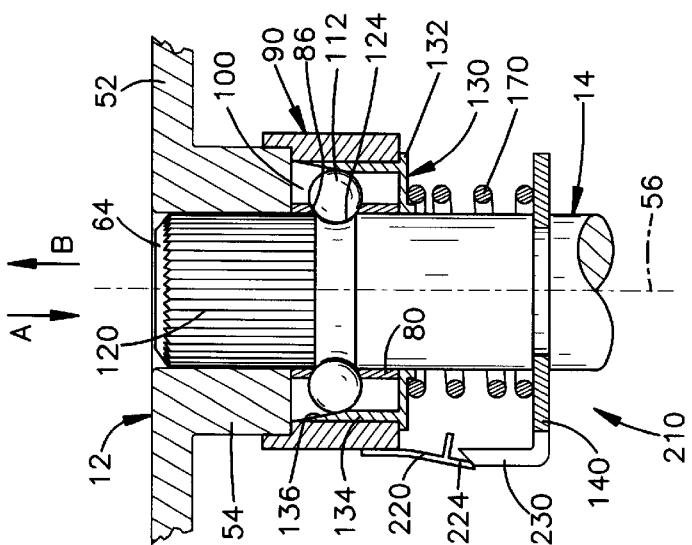
FIG. 7 is a sectional view of the apparatus of FIG. 6 illustrating a fully assembled condition.
Figure 6:
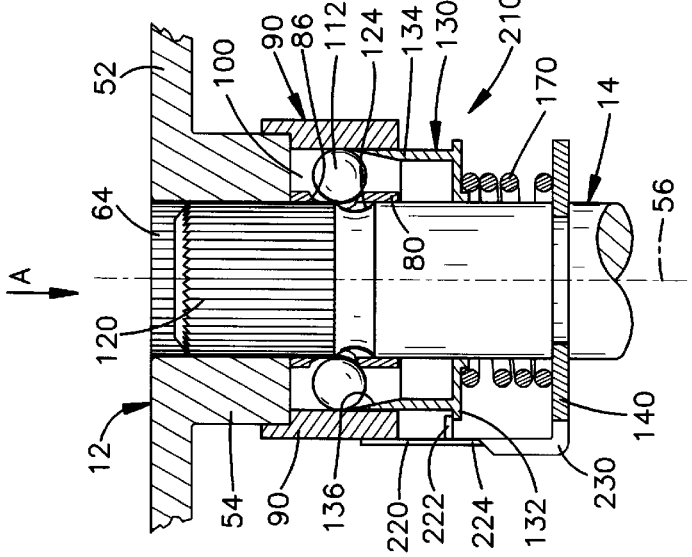
FIG. 6 is a sectional view of the apparatus of FIG. 5 illustrating a partially assembled condition.
Figure 5:
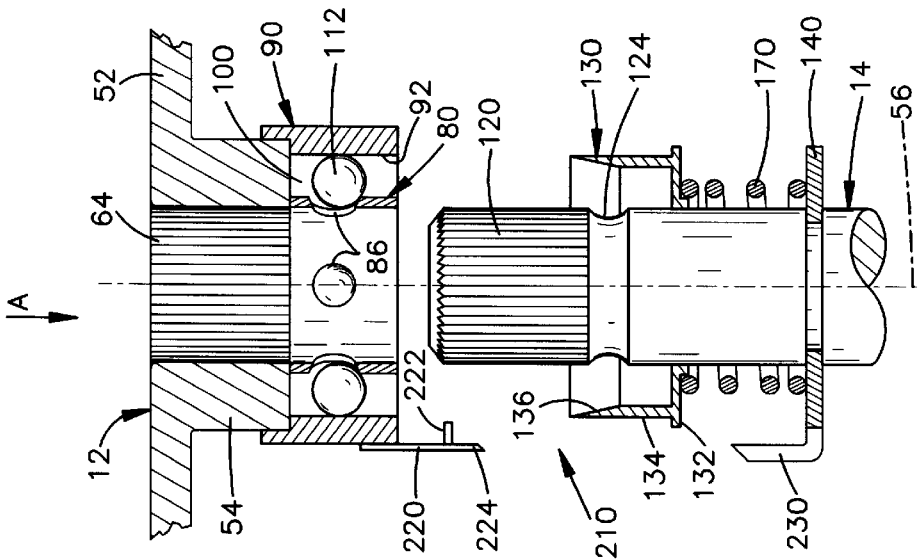
FIG. 5 is an exploded sectional view of an apparatus for attaching a vehicle steering wheel and a steering shaft in accordance with a second embodiment of the present invention.

FIGS. 5–7 illustrate an apparatus 210 for attaching a steering wheel to a steering shaft in accordance with a second embodiment of the present invention. In the second embodiment of FIGS. 5–7, reference numbers that are the same as those used in the first embodiment of FIGS. 1–4 are used to designate parts that are similar to parts in the first embodiment.

According to the second embodiment, the outer sleeve 90 includes a deflectable tab 220 projecting axially away from the hub portion 54. The tab 220 is made of spring steel and includes a radially inwardly extending cocking portion 222 and an axially extending end portion 224. On the steering shaft 14, the latch member 160 of the first embodiment is replaced with an axially extending deflecting member 230.

The apparatus 210 according to the second embodiment is designed to self-cock the spring 170 during the attachment process. As the hub portion 54 of the steering wheel 12 is placed over the steering shaft 14 and is pushed in the downward direction of arrow A, the cocking portion 222 of the tab 220 engages the base portion 132 of the collar 130 and compresses the spring 170 as shown in FIG. 6. The spring 170 is compressed until the end portion 224 of the tab 220 engages the deflecting member 230. As with the first embodiment, the tapered surface 136 on the flange portion 134 of the collar 130 on the steering shaft 14 slides into the chamber 100 as the steering wheel 12 is moved downward.

To complete the attachment of the steering wheel 12 to the steering shaft 14, the steering wheel is pushed farther in the downward direction A from the position of FIG. 6 to the connected condition illustrated in FIG. 7. As the steering wheel 12 is moved into the connected condition, the deflecting member 230 deflects the tab 220 on the outer sleeve 90 radially outward, causing the cocking portion 222 of the tab to disengage from the base portion 132 of the collar 130. The collar 130 is then forced in the upward direction B by the bias of the spring 170. The collar 130 moves in the upward direction B until the base portion 132 of the collar 130 engages the outer sleeve 90, as shown in FIG. 7.

As the collar 130 moves upward, the tapered surface 136 on the collar engages the balls 112 and slides into a position radially outward of, or behind, the balls, forcing the balls to move radially inward. The balls 112 are moved radially inward by the flange portion 134 of the collar 130, and are thus pushed farther into the openings 86 in the inner sleeve 80. A portion of each of the balls 112 projects through a respective one of the openings 86 and is forced into the arcuate groove 124 that has become radially aligned with the openings 86 as a result of the downward movement of the steering wheel 12.

As shown in FIG. 7, the tapered surface 136 on the collar 130 is disposed behind the balls 112 and thus holds the balls in the arcuate groove 124 in the steering shaft 14. The positioning of the collar 130 behind the balls 112 prevents the balls from moving radially outward and thereby maintains the apparatus 210 in the connected condition of FIG. 7. In the connected condition, relative axial movement between the steering wheel 12 and the steering shaft 14 is blocked by the engagement of the balls 112 in the groove 124.

To remove the steering wheel 12 from the steering shaft 14, the collar 130 must be retracted from the position shown in FIG. 7 to the position of FIG. 6. The collar 130 is retracted using a tool (not shown). After the collar 130 is retracted, the balls 112 are no longer held in the groove 124 and are free to move radially outward out of the groove. The steering wheel 12 is then pulled in the upward direction B, causing the balls 112 to cam out of the arcuate groove 124. With the balls 112 disengaged from the groove 124, the steering wheel 12 can be removed from the end portion 120 of the steering shaft 14.

FIGS. 8 and 9 illustrate an apparatus 310 for attaching a steering wheel to a steering shaft in accordance with a third embodiment of the present invention. In the third embodiment of FIGS. 8 and 9, reference numbers that are the same as those used in the first embodiment of FIGS. 1–4 are used to designate parts that are similar to parts in the first embodiment.

According to the third embodiment, the outer sleeve 90 of the first embodiment is eliminated and is replaced with an axially movable collar 320 that is disposed about an inner sleeve 330. The inner sleeve 330 includes an upper end portion 332 and a lower end portion 334. A central portion of the inner sleeve 330 includes a circumferential recess 336 that is presented radially outwardly and a plurality of openings 338 that extend radially inwardly from the recess to the inner surface of the collar. The balls 112 are located partially in the recess 336 and partially in the openings 338.

The collar 320 has a radially extending flange portion 322 at its end adjacent the hub portion 54 and an axially extending main body portion 324 that encircles the inner sleeve 330. The main body portion 324 of the collar 320 includes a cylindrical inner surface 326 and a conical inner surface 328. A spring 340 is positioned between the flange portion 322 of the collar 320 and the lower bracket 52 of the armature 20. The spring 340 encircles the hub portion 54 and biases the collar 320 away from the lower bracket 52.

A latch member 350 is pivotally mounted to the underside of the lower bracket 52 of the armature 20. The latch member 350 includes a catch surface 352 that is engageable with the flange portion 322 of the collar 320. The latch member 350 further includes an angled end surface 354. The latch member 350 is spring-biased radially inward toward engagement with the collar 320, as shown in FIG. 8, but is deflectable radially outward, against its spring-bias, away from engagement with the collar 320, as shown in FIG. 9. On the steering shaft 14, the latch member 160 on the mounting member 140 of the first embodiment is replaced with an axially extending deflecting member 360.

To connect the steering wheel 12 to the steering shaft 14, the collar 320 is first placed into a cocked condition shown in FIG. 8. The collar 320 is cocked by pushing the collar in the upward direction B against the bias of the spring 340 until the catch surface 352 on the latch member 350 engages the flange portion 322 of the collar. In the disconnected, but cocked condition of FIG. 8, the cylindrical inner surface 326 on the collar 320 is engageable by the balls 112 to prevent the balls from coming completely out of the openings 338 in the inner sleeve 330.

The steering wheel 12 is then pushed in the downward direction A to complete the attachment of the steering wheel to the steering shaft 14. As the steering wheel 12 is moved into the connected condition of FIG. 9, the deflecting member 360 engages the angled end surface 354 on the latch member 350 and deflects the latch member radially outward. This causes the latch member 350 to disengage from the flange portion 322 of the collar 320. The collar 320 is then forced in the downward direction A by the bias of the spring 340. The collar 320 moves in the downward direction A until the collar engages the mounting member 140, as shown in FIG. 9.

As the collar 320 moves toward the position of FIG. 9, the conical inner surface 328 on the collar engages the balls 112 and forces the balls to move radially inward. The balls 112 are moved radially inward by the conical inner surface 328 of the collar 320, and are thus pushed farther into the openings 338 in the inner sleeve 330. A portion of each of the balls 112 projects through a respective one of the openings 338 and is forced into the arcuate groove 124 that has become radially aligned with the openings as a result of the downward movement of the steering wheel 12.

The positioning of the collar 320 radially outward of or behind the balls 112 prevents the balls from moving radially outward and thereby maintains the apparatus 310 in the connected condition of FIG. 9. In the connected condition, relative axial movement between the steering wheel 12 and the steering shaft 14 is blocked by the engagement of the balls 112 in the groove 124.

As with the previously described embodiments, to remove the steering wheel 12 from the steering shaft 14, the collar 320 must be retracted from the position shown in FIG. 9 to the position of FIG. 8. The collar 320 is retracted using a tool (not shown). After the collar 320 is retracted, the balls 112 are no longer held in the groove 124 and are free to move radially outward out of the groove. The steering wheel 12 is then pulled in the upward direction B, causing the balls 112 to cam out of the arcuate groove 124. With the balls 112 disengaged from the groove 124, the steering wheel 12 can be removed from the end portion 120 of the steering shaft 14.

Figure 12:
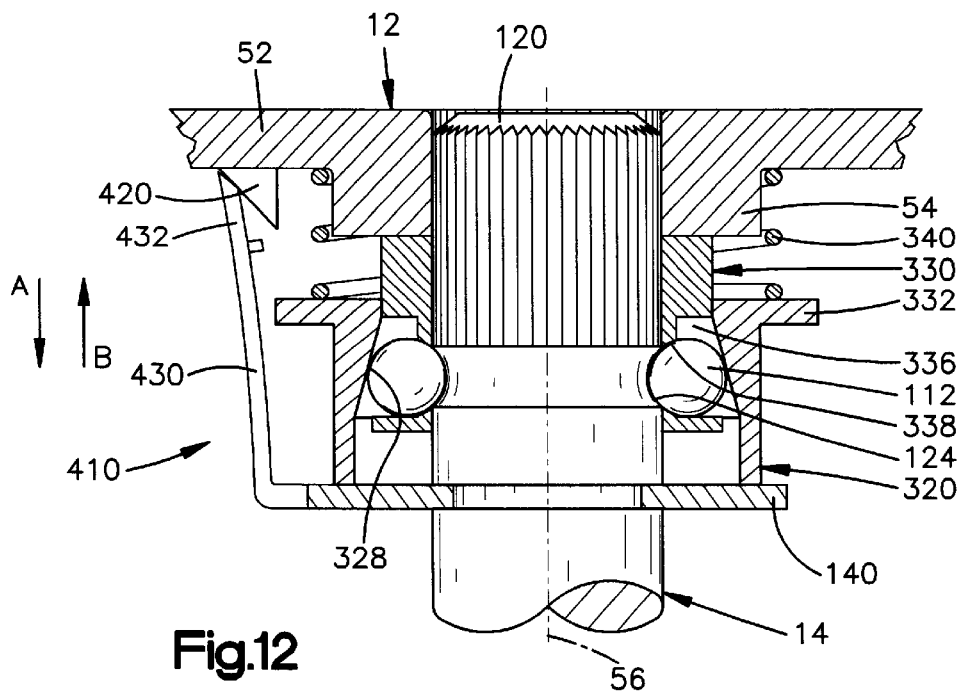
FIG. 12 is a sectional view of the apparatus of FIG. 10 illustrating a fully assembled condition.

FIGS. 10–12 illustrate an apparatus 410 for attaching a steering wheel to a steering shaft in accordance with a fourth embodiment of the present invention. In the fourth embodiment of FIGS. 10–12, reference numbers that are the same as those used in the third embodiment of FIGS. 8 and 9 are used to designate parts that are similar to parts in the third embodiment.

According to the fourth embodiment, the latch member 350 is eliminated and a ramp member 420 is mounted to the underside of the lower bracket 52 of the armature 20. On the steering shaft 14, the deflecting member 360 is replaced with a deflecting member 430 that includes an end portion 432 and a radially inwardly projecting cocking portion 434. The deflecting member 430 is deflectable radially outward to the position shown in FIG. 12.

The apparatus 410 according to the fourth embodiment is designed to self-cock the spring 340 during the attachment process. As the hub portion 54 of the steering wheel 12 is placed over the steering shaft 14 and is pushed in the downward direction A, the cocking portion 434 of the deflecting member 430 engages the flange portion 322 of the collar 320 and compresses the spring 340, as shown in FIG. 11. The spring 340 is compressed until the end portion 432 of the deflecting member 430 engages the ramp member 420. In the disconnected, but cocked condition of FIG. 11, the cylindrical inner surface 326 on the collar 320 is engageable by the balls 112 to prevent the balls from coming completely out of the openings 338 in the inner sleeve 330.

The steering wheel 12 is then pushed in the downward direction of arrow A to complete the attachment of the steering wheel to the steering shaft 14. As the steering wheel 12 is moved into the connected condition of FIG. 12, the deflecting member 430 engages the ramp member 420 and is deflected radially outward. This causes the cocking portion 434 of the deflecting member 430 to disengage from the flange portion 322 of the collar 320. The collar 320 is then forced in the upward direction B by the bias of the spring 340. The collar 320 moves in the downward direction A until the collar engages the mounting member 140, as shown in FIG. 12.

As the collar 320 moves downward, the conical inner surface 328 on the collar engages the balls 112 and forces the balls to move radially inward. The balls 112 are moved radially inward by the conical inner surface 328, and are thus pushed farther into the openings 338 in the inner sleeve 330. A portion of each of the balls 112 projects through a respective one of the openings 338 and is forced into the arcuate groove 124 that has become radially aligned with the openings as a result of the downward movement of the steering wheel 12.

The positioning of the collar 320 radially outward of or behind the balls 112 prevents the balls from moving radially outward and thereby maintains the apparatus 410 in the connected condition of FIG. 12. In the connected condition, relative axial movement between the steering wheel 12 and the steering shaft 14 is blocked by the engagement of the balls 112 in the groove 124.

As with the previously described embodiments, to remove the steering wheel 12 from the steering shaft 14, the collar 320 must be retracted from the position shown in FIG. 12 to the position of FIGS. 10 and 11. The collar 320 is retracted using a tool not shown. After the collar 320 is retracted, the balls 112 are no longer held in the groove 124 and are free to move radially outward out of the groove. The steering wheel 12 is then pulled in the upward direction B, causing the balls 112 to cam out of the arcuate groove 124. With the balls 112 disengaged from the groove 124, the steering wheel 12 can be removed from the end portion 120 of the steering shaft 14.

Figure 13:
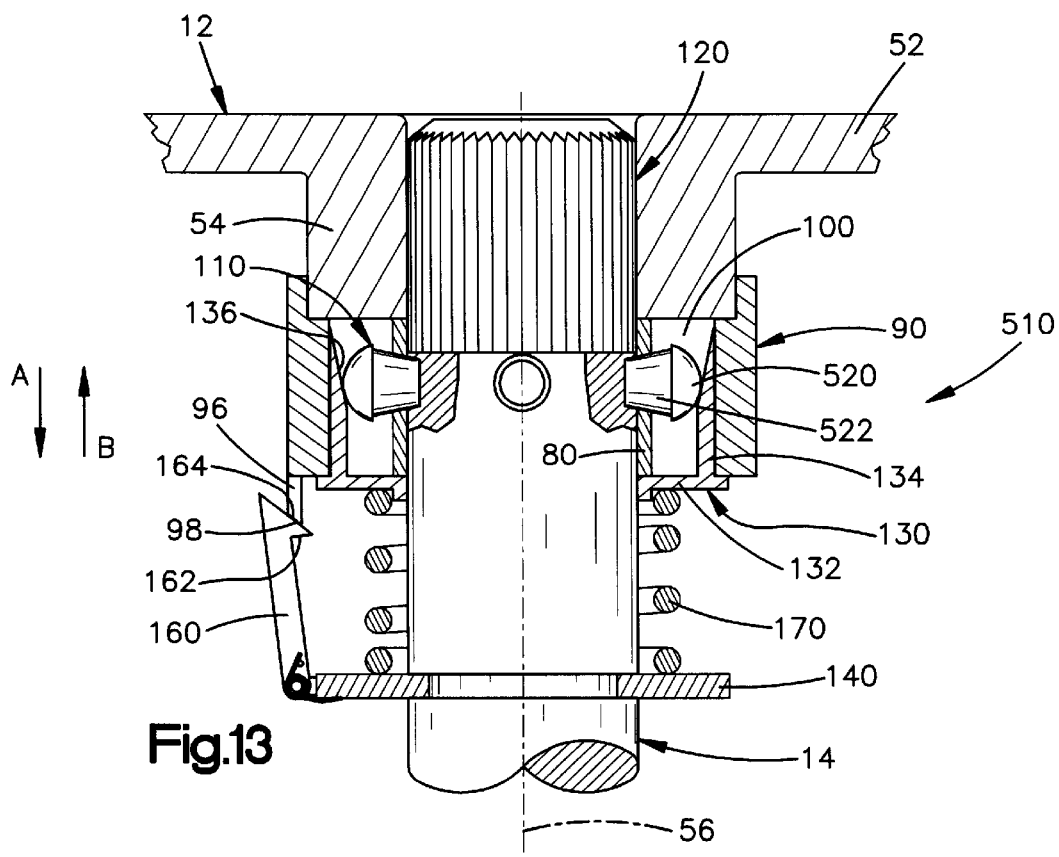
FIG. 13 is a sectional view of an apparatus for attaching a vehicle steering wheel and a steering shaft in accordance with a fifth embodiment of the present invention.

FIG. 13 illustrates an apparatus 510 for attaching a steering wheel to a steering shaft in accordance with a fifth embodiment of the present invention. In the fifth embodiment of FIG. 13, reference numbers that are the same as those used in the first embodiment of FIGS. 1–4 are used to designate parts that are similar to parts in the first embodiment.

According to the fifth embodiment, the bearing elements 110 are not balls, but instead have a hemispherical portion 520 and a frustoconical portion 522. The frustoconical portion 522 of each of the bearing elements 110 projects into a respective one of the openings 86 in the inner sleeve 80. The hemispherical portion 520 of each of the bearing elements is engageable by the collar 130.

The apparatus 510 according to the fifth embodiment functions similarly to the previously described embodiments to, in the connected condition, block relative axial movement between the steering wheel 12 and the steering shaft 14. It should be understood that the bearing elements 110 according to the fifth embodiment could be used in any of the embodiments described above.

Each of the embodiments of the present invention described above provides a fastener-less attachment of the steering wheel 12 to the steering shaft 14. These "snap-on" attachment embodiments allow for blind attachment of the steering wheel 12 to the steering shaft 14, which is particularly advantageous given the typically limited access space in the area where the steering wheel attaches. A further advantage of the embodiments of the present invention is the reduction in the amount of time needed to attach the steering wheel 12 to the steering shaft 14.

From the above description of the invention, those skilled in the art will perceive improvements, changes and modifications. Such improvements, changes and modifications within the skill of the art are intended to be covered by the appended claims.

Having described the invention, I claim:

1. An apparatus comprising:

a vehicle steering wheel having a hub portion, said hub portion including an axially extending inner sleeve having a circumferentially spaced plurality of openings;

a vehicle steering shaft having an end portion that includes a circumferentially extending arcuate groove;

a plurality of bearing elements at least partially disposed in said plurality of openings in said inner sleeve of said steering wheel, said plurality of bearing elements being movable in a radial direction within said plurality of openings between a disconnected condition permitting relative axial movement between said steering wheel and said steering shaft and a connected condition blocking relative axial movement between said steering wheel and said steering shaft; and an axially movable collar engageable with said plurality of bearing elements to move said bearing elements in the radial direction from said disconnected condition to said connected condition, said plurality of bearing elements being moved by said collar to said connected condition in which said bearing elements are partially located within said plurality of openings and partially located in said arcuate groove in said steering shaft.

2. The apparatus of claim 1 further comprising an axially extending outer sleeve extending from said hub portion and encircling said inner sleeve, said outer sleeve being engageable with said bearing elements in said disconnected condition to maintain said bearing elements at least partially disposed in said openings in said inner sleeve.

3. The apparatus of claim 2 wherein said inner and outer sleeves define a chamber into which said collar projects, said collar being disposed radially outward of said bearing elements in said connected condition and pressing said bearing elements into said arcuate groove in said steering shaft.

4. The apparatus of claim 1 wherein said collar is secured about said steering shaft.

5. The apparatus of claim 4 wherein said collar is spring-loaded.

6. The apparatus of claim 1 wherein said collar is secured about said hub portion of said steering wheel armature.

7. The apparatus of claim 6 wherein said collar is spring-biased away from said steering wheel.

8. The apparatus of claim 1 wherein said collar is axially movable between first and second positions that correspond to said disconnected and connected conditions, respectively, said collar holding said bearing elements at least partially disposed in said openings in said first position, said collar pressing said bearing elements into said arcuate groove in said steering shaft in said second position.

9. The apparatus of claim 1 wherein said hub portion includes a splined inner surface and said end portion of said steering shaft includes a splined outer surface that meshes with said splined inner surface to connect said steering shaft non-rotatably with said steering wheel for joint rotation with said steering wheel.

10. The apparatus of claim 1 further comprising an air bag module secured to said steering wheel armature.

11. The apparatus of claim 10 further comprising a cover secured to said steering wheel and covering said air bag module.

12. The apparatus of claim 11 wherein said cover is molded about said steering wheel and extends uninterruptedly over said air bag module.

13. The apparatus of claim 1 wherein said plurality of bearing members each have a spherical shape.

14. The apparatus of claim 1 wherein said plurality of bearing members each have a hemispherical portion and a frustoconical portion, said frustoconical portion of each of said bearing elements projecting into a respective one of said openings in said sleeve, said hemispherical portion of each of said bearing elements being engageable by said collar.

* * * * *